US006867828B2

(12) United States Patent
Taira et al.

(10) Patent No.: US 6,867,828 B2
(45) Date of Patent: Mar. 15, 2005

(54) LIGHT GUIDE APPARATUS, A BACKLIGHT APPARATUS AND A LIQUID CRYSTAL DISPLAY APPARATUS

(75) Inventors: Yoichi Taira, Tokyo (JP); Fumiaki Yamada, Yokohama (JP); Akiko Nishikai, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/713,116

(22) Filed: Nov. 17, 2003

(65) Prior Publication Data

US 2004/0105046 A1 Jun. 3, 2004

Related U.S. Application Data

(62) Division of application No. 09/664,719, filed on Sep. 19, 2000, now Pat. No. 6,667,782.

(30) Foreign Application Priority Data

Oct. 8, 1999 (JP) .......................................... 11-287776

(51) Int. Cl.[7] ................................................ G02F 1/13
(52) U.S. Cl. ......................................... 349/65; 362/31
(58) Field of Search ............................... 349/65; 362/31

(56) References Cited

U.S. PATENT DOCUMENTS 4,277,817 A    7/1981   Hehr 5,528,720 A    6/1996   Winston et al.

FOREIGN PATENT DOCUMENTS

| JP | 06-230384 | 8/1994 |
| JP | 07-261122 | 10/1995 |
| JP | 07-270792 | 10/1995 |
| JP | 08-271739 | 10/1996 |
| JP | 09-113903 | 5/1997 |
| JP | 09-318942 | 12/1997 |
| JP | 10-503600 | 3/1998 |
| JP | 10-319217 | 12/1998 |

OTHER PUBLICATIONS

Japanese Office Action dated Feb. 5, 2002.

*Primary Examiner*—James A. Dudek
(74) *Attorney, Agent, or Firm*—Robert M. Trepp, Esq.; McGinn & Gibb, PLLC

(57) ABSTRACT

A backlight apparatus (and light guide and liquid crystal display apparatus incorporating the same) includes a wedge-type light guide having a refractive index n1, and having a top surface, a bottom surface and a side surface, a light source for directing light to the side surface of the wedge-type light guide, a first light transmission layer having a refractive index n2, which is smaller than said refractive index n1, and having a top surface and a bottom surface, wherein the top surface of the first light transmission layer is attached to the bottom surface of the wedge-type light guide, and a light deflecting layer having a top surface attached to the bottom surface of the first light transmission layer for deflecting the incident light from the first light transmission layer toward the top surface of the wedge-type light guide.

14 Claims, 8 Drawing Sheets

(A)

(B)

LIGHT GUIDE APPARATUS, A BACKLIGHT APPARATUS AND A LIQUID CRYSTAL DISPLAY APPARATUS

The present application is a Divisional application of U.S. patent application Ser. No. 09/664,719, filed on Sep. 19, 2000 now U.S. Pat. No. 6,667,782.

BACKGROUND OF THE INVENTION

1. Field of the Invention

The present invention relates to a light guide apparatus, a backlight apparatus and a liquid crystal display (LCD) apparatus using the backlight apparatus.

2. Description of the Related Art

A backlight apparatus has been used as a light source of an LCD apparatus. FIG. 1(A) shows an LCD apparatus using a conventional backlight apparatus. The conventional backlight apparatus includes a fluorescent lamp 1 generating white light, a reflecting cover 2 mounted to surround a top side, a bottom side and a rear side of the fluorescent lamp 1, a wedge-type light guide 3, a light scattering layer 4 attached on the bottom surface of the light guide 3, a metallic reflector 5 placed below the light guide 3, and light-shaping films 6 and 7 placed above the light guide 3. A prism sheet, which refracts the incidence light directed from an oblique direction toward a vertical direction of the prism sheet, is frequently used as the light-shaping films 6 and 7. The light scattering layer 4 is actually a dotted pattern printed on the bottom surface of the light guide 3.

Each of the dots diffuses the incidence light upwardly with a large angle distribution, as shown in a right side portion of the light scattering layer 4 in FIG. 1. By controlling the density of the dots over the bottom surface of the light guide 3, the backlight apparatus can uniformly pass the light through from the top surface of the light guide 3. The emitted light from the top surface of the light guide 3 is diffused with a large angle distribution. For some applications such as an LCD apparatus for notebook personal computers, this angle distribution of the emitted light is so large that the efficiency of usage of the light from the light source, or the fluorescent lamp 1 is not high. Therefore, one or more light-shaping sheets are used to obtain the appropriate angle distribution. The metallic reflector 5 serves as a light recirculator, which can reflect the light leaking out from the bottom light scattering layer 4 back into the light guide 3, for light recycling.

The light emitted by the backlight apparatus is directed to an LCD panel 10 through a polarizer 8. A polarizer 9 also is placed above the LCD panel 10. The LCD panel 10 includes an upper glass substrate 11 and a lower glass substrate 12, and peripheral edges of both the glass substrates 11 and 12 are sealed by a sealing area 13. A color filter which includes red, green and blue color filter segments, and a common electrode, not shown in FIG. 1(A), are formed on the inner surface of the upper glass substrate 11 to realize the color LCD apparatus. One pixel is constituted by three sub-pixels (i.e., the R, G and B sub-pixels). The liquid crystal material, such as a 90-degrees twisted nematic (TN) liquid crystal material is enclosed within the space between the glass substrates 11 and 12.

A first problem of the conventional backlight apparatus is that it is very difficult to obtain the light emitted with an angle spread less than 10 degrees FWHM (Full Width at Half Maximum), as shown in FIG. 1(B).

Another problem of the conventional backlight apparatus is that the backlight apparatus requires many components, some of which are not easily fabricated, so that the fabrication cost becomes high.

A third problem of the conventional backlight apparatus is that since the light from the fluoresecent lamp 1 passes through many components, the intensity of the light is largely attenuated while passing through the components.

SUMMARY OF THE INVENTION

In view of the foregoing and other problems, disadvantages, and drawbacks of the conventional methods and structures, an object of the present invention is to provide a light guide and a backlight apparatus which emits light with an angle spread less than 10 degrees FWHM.

It is another object of the present invention to provide a light guide and a backlight apparatus with reduced fabrication cost.

It is yet another object of the present invention to provide a light guide and a backlight apparatus which improves the efficiency of usage of the light from the light source.

It is still another object of the present invention to provide an LCD apparatus using the light guide apparatus and the backlight apparatus mentioned above.

A backlight apparatus in accordance with a first aspect of the present invention includes a wedge-type light guide of a refractive index n1, having a top surface, a bottom surface and a side surface,
a light source for directing light to the side surface of the wedge-type light guide, a first light transmission layer of a refractive index n2, which is smaller than the refractive index n1, having a top surface and a bottom surface, wherein the top surface of the first light transmission layer is attached to the bottom surface of the wedge-type light guide, and a light deflecting layer having a top surface attached to the bottom surface of the first light transmission layer for deflecting the incident light from the first light transmission layer toward the top surface of the wedge-type light guide.

The range of the refractive index n1 of the wedge-type light guide is preferably approximately 1.4 through approximately 2.0, and the range of the refractive index n2 of the first light transmission layer is preferably approximately 1.2 through approximately 1.4.

The refractive index n1 of the wedge-type light guide is preferably approximately 1.49, and the refractive index n2 of the first light transmission layer is preferably approximately 1.3.

The range of a top angle between the top surface and the bottom surface of the wedge-type light guide is preferably approximately 0.1 through approximately 3 degrees.

The light deflecting layer preferably includes a second light transmission layer having a refractive index, which is substantially equal to the refractive index n1 of the wedge-type light guide, and a plurality of mirrors, each of which has a reflecting surface tilted by a selected angle from the top surface of the light deflecting layer to reflect the incident light from the first light transmission layer through the second light transmission layer toward a light path along a direction of a normal line of the top surface of the wedge-type light guide, wherein the second light transmission layer is attached to the bottom surface of the first light transmission layer, and the second light transmission layer and the plurality of mirrors are integrally formed.

The light deflecting layer includes a plurality of mirrors, each of which has a reflecting surface tilted by a selected angle from the top surface of the light deflecting layer to reflect the incident light from the first light transmission layer toward a light path along a direction of a normal line of the top surface of the wedge-type light guide, wherein the first light transmission layer and the plurality of mirrors are integrally formed.

The plurality of mirrors includes mirrors, each of which has the reflecting surface tilted by the selected angle, mirrors, each of which has the reflecting surface tilted by an angle larger than the selected angle, and mirrors, each of which has the reflecting surface tilted by an angle smaller than the selected angle.

The light source includes a fluorescent lamp, and the light reflecting surface of each of the mirrors continuously extends in a direction, which is parallel to a center line of the fluorescent lamp.

A backlight apparatus in accordance with a second aspect of the present invention includes a wedge-type light guide of a refractive index n1, having a top surface, a bottom surface and a side surface, a light source for directing light to the side surface of the wedge-type light guide, a light transmission layer of a refractive index n2, which is smaller than the refractive index n1, having a top surface and a bottom surface, wherein the bottom surface of the light transmission layer is attached to the top surface of the wedge-type light guide, and a plurality of prisms attached on the top surface of the light transmission layer for directing the incident light from the light transmission layer toward a light path along a direction of a normal line of the top surface of the light transmission layer.

A backlight apparatus in accordance with a third aspect of the present invention includes a wedge-type light guide of a refractive index n1, having a top surface, a bottom surface and a side surface, a light source for directing light to the side surface of the wedge-type light guide, a first light transmission layer of a refractive index n2, which is smaller than the refractive index n1, having a top surface and a bottom surface, wherein the top surface of the first light transmission layer is attached to the bottom surface of the wedge-type light guide, and a light deflecting layer having a top surface attached to the bottom surface of the first light transmission layer for separating colors of the incident light from the first light transmission layer and for directing the lights of the separated colors toward the top surface of the wedge-type light guide.

The light deflecting layer includes a second light transmission layer having a refractive index, which is substantially equal to the refractive index n1 of the wedge-type light guide, and a reflective diffraction grating for separating the incident light from the first light transmission layer through the second light transmission layer into the light of red, green and blue colors, and for directing the light of the green color, the blue color and the red color, along three light paths, respectively, wherein one of the three light paths is parallel to a normal line of the top surface of the wedge-type light guide, and the remaining two light paths are separated from the one light path, and the second light transmission layer and the reflective diffraction grating are integrally formed.

The light deflecting layer includes a reflective diffraction grating for separating the incident light from the first light transmission layer into the light of red, green and blue colors, and for directing the light of the green color, the blue color and the red color, along three light paths, respectively, wherein one of the three light paths is parallel to a normal line of the top surface of the wedge-type light guide, and the remaining two light paths are separated from the one light path, and the first light transmission layer and the reflective diffraction grating are integrally formed.

A liquid crystal display (LCD) apparatus in accordance with yet another aspect of the present invention includes an LCD panel including an upper transparent substrate, a lower transparent substrate, and a liquid crystal material filled between the upper transparent substrate and the lower transparent substrate, a light diffusing layer adjacent to the upper transparent substrate, and a backlight apparatus adjacent to the lower transparent substrate, wherein the backlight apparatus includes a wedge-type light guide of a refractive index n1, having a top surface, a bottom surface and a side surface, a light source for directing light to the side surface of the wedge-type light guide, a first light transmission layer of a refractive index n2, which is smaller than the refractive index n1, having a top surface and a bottom surface, wherein the top surface of the first light transmission layer is attached to the bottom surface of the wedge-type light guide, and a light deflecting layer having a top surface attached to the bottom surface of the first light transmission layer for deflecting the incident light from the first light transmission layer toward the top surface of the wedge-type light guide.

A color filter is formed preferably on an inner surface of the upper transparent substrate.

An LCD apparatus in accordance with yet another aspect of the present invention includes an LCD panel including an upper transparent substrate, a lower transparent substrate, and a liquid crystal material filled between the upper transparent substrate and the lower transparent substrate, a light diffusing layer adjacent to the upper transparent substrate, and a backlight apparatus adjacent to the lower transparent substrate, wherein the backlight apparatus includes a wedge-type light guide of a refractive index n1, having a top surface, a bottom surface and a side surface, a light source for directing light to the side surface of the wedge-type light guide; a light transmission layer of a refractive index n2, which is smaller than the refractive index n1, having a top surface and a bottom surface, wherein the bottom surface of the light transmission layer is attached to the top surface of the wedge-type light guide, and a plurality of prisms attached on the top surface of the light transmission layer for directing the incident light from the light transmission layer toward a light path along a direction of a normal line of the top surface of the light transmission layer.

An LCD apparatus in accordance with a still further aspect of the present invention includes an LCD panel including an upper transparent substrate, a lower transparent substrate, and a liquid crystal material filled between the upper transparent substrate and the lower transparent substrate, a light diffusing layer adjacent to the upper transparent substrate, and a backlight apparatus adjacent to the lower transparent substrate, wherein the backlight apparatus includes a wedge-type light guide of a refractive index n1, having a top surface, a bottom surface and a side surface, a light source for directing light to the side surface of the wedge-type light guide, a first light transmission layer of a refractive index n2, which is smaller than the refractive index n1, having a top surface and a bottom surface, wherein the top surface of the first light transmission layer is attached to the bottom surface of the wedge-type light guide, and a light deflecting layer having a top surface attached to the bottom surface of the first light transmission layer for separating colors of the incident light from the first light transmission layer and for directing the light of the separated colors toward the top surface of the wedge-type light guide.

A lens array is arranged preferably between the lower transparent substrate and the top surface of the wedge-type light guide, and the lens array directs the light of blue color, the light of green color and the light of red color to three adjacent sub-pixels of the LCD panel, respectively.

A light guide apparatus in accordance with another aspect of the present invention includes a wedge-type light guide of a refractive index n1, having a top surface, a bottom surface and a side surface, a light transmission layer of a refractive index n2, which is smaller than the refractive index n1, having a top surface and a bottom surface, wherein the top surface of the light transmission layer is attached to the bottom surface of the wedge-type light guide, and a light deflecting layer having a top surface attached to the bottom surface of the light transmission layer for deflecting the incident light from the light transmission layer toward the top surface of the wedge-type light guide.

A light guide apparatus in accordance with yet another aspect of the present invention includes a wedge-type light guide of a refractive index n1, having a top surface, a bottom surface and a side surface, a light transmission layer of a refractive index n2, which is smaller than the refractive index n1, having a top surface and a bottom surface, wherein the bottom surface of the light transmission layer is attached to the top surface of the wedge-type light guide, and a plurality of prisms attached on the top surface of the light transmission layer for directing the incident light from the light transmission layer toward a light path along a direction of a normal line of the top surface of the light transmission layer.

A light guide apparatus in accordance with yet another aspect of the present invention includes a wedge-type light guide of a refractive index n1, having a top surface, a bottom surface and a side surface, a light transmission layer of a refractive index n2, which is smaller than the refractive index n1, having a top surface and a bottom surface, wherein the top surface of the light transmission layer is attached to the bottom surface of the wedge-type light guide; and a light deflecting layer having a top surface attached to the bottom surface of the light transmission layer for separating colors of the incident light from the light transmission layer and for directing the light of the separated colors toward the top surface of the wedge-type light guide.

The present disclosure relates to subject matter contained in Japanese Patent Application No 11-287776 filed Oct. 8, 1999, which is expressly incorporated herein by reference in its entirety.

DETAILED DESCRIPTION OF PREFERRED EMBODIMENTS OF THE INVENTION

Figure 1:
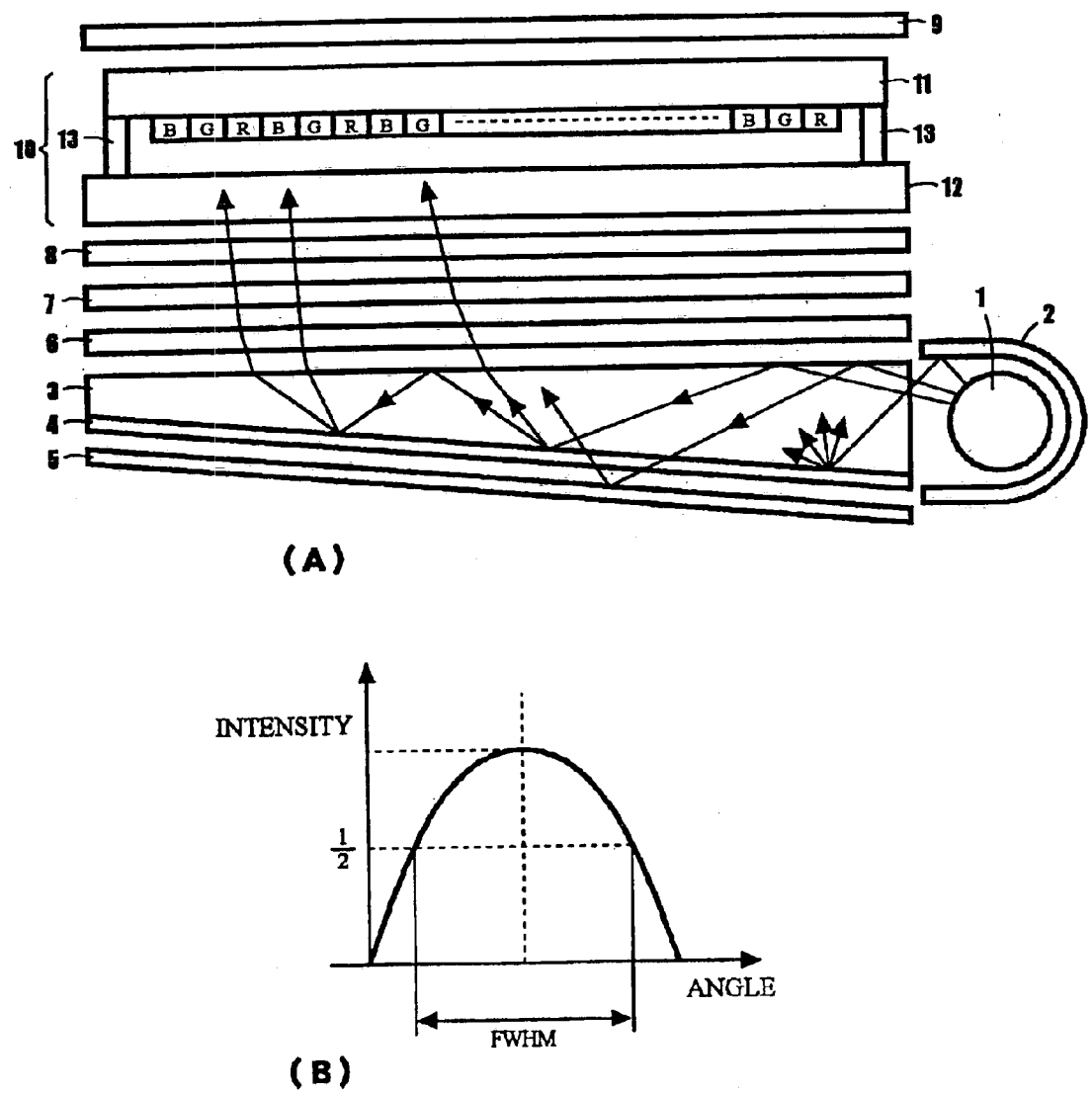
FIGS. 1A and 1B, respectively, show an LCD apparatus and waveform using a conventional backlight apparatus.

Referring now to the drawings, and more particularly to FIGS. 1A–12, there are shown preferred embodiments of the structures according to the present invention.

First Embodiment

Figure 2:
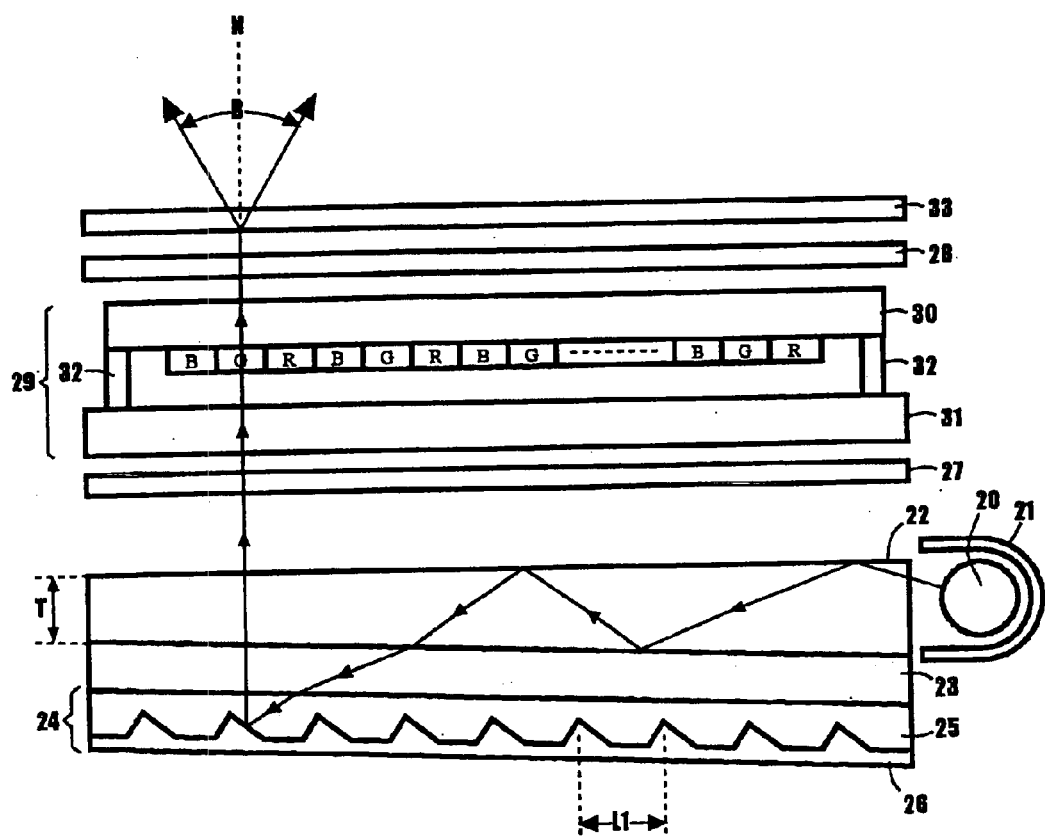
FIG. 2 shows a first embodiment of the color LCD apparatus using the backlight apparatus in accordance with the present invention.

FIG. 2 shows a first embodiment of the color LCD apparatus using the backlight apparatus in accordance with the present invention. The backlight apparatus includes a light source 20, such as a cold cathode fluorescent lamp, for generating white light, a reflecting cover 21 mounted to surround a top side, a bottom side and a rear side of the fluorescent lamp 20, a wedge-type light guide 22 of a refractive index n1, a first light transmission layer 23 of a refractive index n2, which is smaller than the refractive index n1 of the light guide 22 and is larger than the refractive index of the air, which is about 1.0, and a light deflecting layer 24 of the refractive index substantially equal to the refractive index n1 of the light guide 22.

The top surface and the bottom surface of the first light transmission layer 23 are parallel to each other, and the top surface of the first light transmission layer 23 contacts the bottom surface of the wedge-type light guide 22. The light from the fluorescent lamp 20 enters into the light guide 22 through the side surface of the light guide 22. The top surface and the bottom surface of the light deflecting layer 24 are parallel to each other, and the top surface of the light deflecting layer 24 contacts the bottom surface of the first light transmission layer 23. In this manner, the light guide 22, the first light transmission layer 23 and the light deflecting layer 24 contacts each other without any space therebetween. An apex angle or a top angle T defined by the top surface and the bottom surface of the wedge-type light guide 22 is in the range of substantially about 0.1 degree through about 3.0 degrees, and more preferably is about 0.3 degree. The wedge-type light guide 22 is adjacent to the polarizer 27 and the LCD panel 29.

The combination of the wedge-type light guide 22, the light transmission layer 23 and the light deflecting layer 24 (micro mirrors 26 in FIG. 6, a prism sheet 34 in FIG. 7, and a reflective diffraction grating 41 in FIG. 12) is called "the light guide apparatus" in the present application. That is, the backlight apparatus includes the light guide apparatus and the light source.

The light emitted from the top surface of the wedge-type light guide 22 is directed to an LCD panel 29 through a polarizer 27. A polarizer 28 is also placed above the LCD panel 29. The LCD panel 29 includes an upper transparent or glass substrate 30 and a lower transparent or glass substrate 31, and peripheral edges of both the glass substrates 30 and 31 are sealed by a sealing area 32. A pixel array is formed on the inner surface of the lower glass substrate 31. The pixel array includes data lines, gate lines, and a plurality of sub-pixels, each of which is formed at each of the cross points of the data lines and the gate lines, respectively. The sub-pixel can be connected to the data line and the gate line through a thin film transistor (TFT). The three, i.e. red, green and blue sub-pixels form one pixel. Since the pixel array is well known in the art, it is not shown in FIG. 2. A color filter which includes red, green and blue color filter segments, and a common electrode, not shown in FIG. 2, are formed on the inner surface of the upper glass substrate 30 to realize the color LCD apparatus. The liquid crystal material, such as 90-degrees twisted nematic liquid crystal material is enclosed within the space between the glass substrates 30 and 31. A light diffusing layer 33 is placed on the polarizer 28.

The operation of the backlight apparatus in accordance with the present invention is described with reference to FIGS. 2, 3A and 3B. FIGS. 3A and 3B show one of the light paths in the backlight apparatus in accordance with the present invention.

The light directed into the light guide 22 from the light source 20 is reflected back at both the top surface and a bottom interface between the light guide 22 and the first light transmission layer 23 as total internal reflection, if the incidence angle to the top surface of the light guide 22 is larger than the total internal reflection critical angle C1 of the top surface, and the incidence angle to the bottom interface between the light guide 22 and the first light transmission layer 23 is larger than the total internal reflection critical angle C2 of the interface.

During the total internal reflection, the incidence angle to the top surface and the bottom interface becomes smaller and smaller by twice of the top angle of the wedge-type light guide 22. The total internal reflection critical angle C1 of the top surface of the light guide 22 equals ARCSIN (1/n1), wherein the n1 is the refractive index of the material of the light guide 22, and the value "1" is the refractive index of the air existing between the top surface of the light guide 22 and the polarizer 27. The transparent material or the light transmission material having the refractive index of approximately 1.4 through approximately 2.0, such as acrylic resin, glass, polycarbonate, polyethylene or polyester, can be used as the wedge-type light guide 22. The preferable material for the wedge-type light guide 22 is acrylic resin or glass having the refractive index n1=1.49. In this case, the critical angle C1 is equal to 42 degrees, as shown in FIG. 3A.

The total internal reflection critical angle C2 at the interface of the light guide 22 and the first light transmission layer 23, which refractive index n2 is lower than the n1 of the light guide 22, equals ARCSIN (n2/n1). The transparent material or the light transmission material having the refractive index of approximately 1.2 through approximately 1.4, such as fluorinated polymer, Teflon AF 2400 (Trade name) having the refractive index of 1.29 from DuPont Corp, and Optomer Series polymer having the refractive index of 1.38 from JSR Corp., can be used as the first light transmission layer 23. Also, sol-gel material including silica ($SiO_2$) prepared to have the refractive index of approximately 1.2 through 1.4 can be used as the first light transmission layer 23. The preferable material for the first light transmission layer 23 is fluorinated polymer having a refractive index of about 1.3. In the case of the n2=1.3, then the total internal reflection critical angle C2 is equal to 60.7 degrees, as shown in FIG. 3A. Therefore, when the incidence angle of one particular light ray at the interface becomes 60 degrees, some portion of the power of the light leaks out to the first light transmission layer 23 of the low refractive index n2 rather than being reflected back, and almost all the light power enters into the first light transmission layer 23 during the several reflections since the incidence angle gets steeper and steeper every time the light comes back to the interface between the light guide 22 and the first light transmission layer 23.

Since the critical angel C1 of the top surface of the light guide 22 is still small enough for the light to leak out there, all the light power passed through the interface between the light guide 22 having the refractive index n1 and the first light transmission layer 23 having the refractive index n2 lower then the n1. In other words, the incidence angle of the light to the interface becomes smaller than the total internal reflection critical angle C2, before that the incidence angle of the light to the top surface of the light guide 22 becomes smaller than the total internal reflection critical angle C1.

In this manner, the light reflected within the light guide 22 are coming from the interface between the light guide 22 and the first light transmission layer 23 without being leaking through the top surface of the light guide. 22, since the critical angle C1 is smaller than the critical angle C2. The light is transmitted within the first light transmission layer 23, and reaches the interface between the layer 23 and the light deflecting layer 24. The light deflecting layer 24 includes a second light transmission layer 25 having the refractive index substantially equal to the refractive index n1 of the light guide 22, and micro mirrors 26 made of metal, such as Al or Ni. The second light transmission layer 25 and the micro mirrors 26 are integrally formed.

That is, the material of the second light transmission layer 25 contacts to the whole surface of the micro mirrors 26, without any space. The distance L1 between the mirrors 26 is about 50 μm and is very small in comparison with the size of the sub-pixel of the LCD panel 29. The second light transmission layer 25 can be made of acrylic resin or glass. Since the top angle of the wedge-type light guide 22 can be approximately 0.3 degree, the angle distribution or the angle spread of the light that actually enters into the second light transmission layer 25 through a point 48 is very small, and is usually within one degree angle spread, i.e. ±1 degree angle spread.

The reasons for producing the ±1 degree angle spread on the light entering the second light transmission layer 25 through a point 48 on the interface between the first light transmission layer 23 and the second light transmission layer 25, are as follows. First, the light along one light path is described with reference to FIG. 3(A). Since the refractive index of the second light transmission layer 25 is substantially equal to the n1 (=1.49), the entering angle of the light into the second light transmission layer 25 through the point 48 is approximately equals to the angle A, which is the incidence angle to the interface of the light guide 22 and the first light transmission layer 23, as shown in FIG. 3(A). However, the light enters from the first light transmission layer 23 to the second light transmission layer 25 at the point 48 through a plurality of light paths, as shown in FIG. 3(B). In FIG. 3(B), only three light paths 49, 50 and 51 are shown, for simplifying the drawing. When the top angle of the wedge-type light guide 22 is 0.3 degree, the angles of all the light along the plural light paths 49, 50 and 51 fall into the angle range A±1 degrees. That is, the angle between the light path 49 and the normal line N is equal to the angle A, the angle between the light path 50 and the normal line N is equal to the angle A−1 degrees, and the angle between the light path 51 and the normal line N is equal to the angle A+1 degrees.

In this manner, the angles of the light entering into the second light transmission layer 25 fall into the angle range A±1 degrees. In the exemplary case, the angle range A±1 is substantially equal to 60±1 degrees, and this 60±1 degrees angle range is called an "angle D" in the present application. The light directed to the micro mirrors 26 is reflected toward the light guide 22. The top surface of the light guide 22 is parallel to the surface of the LCD panel 29. A tilting angle θ of each mirror 26 is defined by the reflecting surface and the flat surface 26A of the mirror 26, which is parallel to the top surface of the light deflecting layer 24. It is noted that when the tilting angle θ is fixed and the angle A is changed by one degree, the angle E between the emitting light and the normal line N is changed by one degree. When the tilting angle θ is changed by one degree and the angle A is fixed, the angle E between the emitting light and the normal line N is changed by two degrees.

When the tilting angle θ is 30 degrees, and the angle D is equal to the 60±1 degrees, the angle spread of the emitting light from the top surface of the light guide 22 is in the range of 0±1 degree, as shown in FIG. 3(A). When the light coming from the light guide 22 passes through the polarizer 27, the LCD panel 29 and the polarizer 28, and passes through the light diffusing layer 33, the light is diffused by the light diffusing layer 33 within a predetermined diffusion angle B, as shown in FIG. 2.

In this manner, the light is entered from the light source 20 to the wedge-type light guide 22 adjacent to the polarizer 27 and the LCD panel 29, then is entered into the first light transmission layer 23 after several total internal reflections in the light guide 22, then is entered into the light deflecting layer 24, then is reflected by the micro mirrors 26 along the normal direction of the surface of the LCD panel 29 with a selected angle spread, and is finally emitted from the top surface of the light guide 22 to the polarizer 27 and the LCD panel 29.

Next, the operational feature of the LCD apparatus in accordance with the present invention, which remarkably differs from the conventional LCD apparatus, and the meritorious effects performed by the present invention are described. In the conventional LCD apparatus using the backlight apparatus, as shown in FIG. 1, the ratio of the light power used for displaying the image is relatively low.

For example, the light power is largely attenuated when the light is reflected back to the light guide 3 by the reflector 5, and the light is deflected by the prism sheets 6 and 7. In this manner, the relatively large light power is lost before it reaches the LCD panel 10, so that a relatively large power source (i.e., a large capacity battery in the case of the notebook PCs) is required. Further, in the case of the TN (Twisted Nematic) mode LCD apparatus, when the user sees the light passing through the liquid crystal molecules along an oblique direction (for example, the direction of 45 degrees separated from the normal line of the display surface) the transmitted light power (i.e., the luminance) is decreased, so that the contrast ratio is decreased.

In contrast to the conventional LCD apparatus, the loss of light power can be remarkably decreased in the present invention, since substantially all the light power from the light source 20 can be transmitted to the light deflecting layer 24 through the interface between the light guide 22 and the first light transmission layer 23 and through the first light transmission layer 23, and substantially all the light power of the incidence light to the light deflecting layer 24 can be reflected or directed toward the LCD panel 29 with the angle spread of 0±1 degree in the case that the tilting angle of the mirrors 26 is substantially 30 degrees.

Further, in the present invention, since the light passes through the TN liquid crystal material of the LCD panel 29 along the light path with ±1 degree angle spread from the normal line of the surface of the LCD panel 29 in the case that the tilting angle of the mirrors 26 is 30 degrees, a decreased contrast ratio depending upon the viewing angle in the conventional LCD apparatus caused by the light passing through the liquid crystal molecules in the oblique direction can be prevented.

Further, since the present invention uses the light diffusing layer 33 for diffusing the light transmitted through the LCD panel 29 by the predetermined diffusing angle, the user can observe the displayed image without a decreased contrast ratio. In this manner, the backlight apparatus in accordance with the present invention can pass the light in the light path along the normal line of the surface of the LCD panel 29 with the minimum angle spread (i.e. ±1 degree) through the liquid crystal molecules of the LCD panel 29, and the light passing through the liquid crystal molecules is diffused by the light diffusing layer 33, which can diffuse the light by the predetermined angle, to provide the user with a desired viewing angle.

Any desired viewing angle can be realized by selecting the diffusing angle of the light diffusing layer 33, without causing the conventional problem due to the light passing through the liquid crystal molecules in the oblique direction. The light path along the normal line of the surface of the LCD panel 29 with the minimum angle spread (i.e., ±1 degree) is realized by the combination of the wedge-type light guide 22 having the refractive index of n1=1.49 and the top angle of 0.3 degree, the first light transmission layer 23 having the refractive index of n2=1.3, and the light deflecting layer 24. The similar light path can be performed by using the top angle of the range of 0.1 degree through 3.0 degrees, the refractive index n1 of the range of 1.4 through 2.0, and the refractive index n2 of the range of 1.2 through 1.4.

The tilting angle θ of the plurality of mirrors 26 can be controlled to control the angle spread of the light from the top surface of the light guide 22. It is noted that the angle of the light directed to each of the mirrors M1 through M5 is the angle D(=60±1 degrees), which is described with respect to FIGS. 3(A) and 3(B).

FIGS. 4(A) and 4(B) show the control of the angle spread of the light from the top surface of the light guide 22. As shown in FIG. 4(A), the tilting angle of the mirrors M1 is shifted to 32 degrees to reflect the light with the angle spread of 4±1 degrees, wherein the angle 4 degrees represents that, due to the shift of the tilting angle θ by +2 degrees from the 30 degrees, the light path of the reflected light is shifted by 4 degrees from the normal line of the top surface of the light guide 22 in the rightward direction in FIG. 4(A), and the angle spread of the ±1 degree is caused by the angle spread of the ±1 degree of the incident light to the reflecting surface of the mirror M1, as described above.

The tilting angle of the mirrors M2 is shifted to 28 degrees to reflect the light with the angle spread of 4±1 degrees, wherein the angle 4 degrees represents that, due to the shift of the tilting angle θ by −2 degrees from the 30 degrees, the light path of the reflected light is shifted by 4 degrees from the normal line of the top surface of the light guide 22 in the leftward direction in FIG. 4(A), and the angle spread of the ±1 degree is caused by the angle spread of the ±1 degree of the incident light to the reflecting surface of the mirror M2, as described above. The tilting angle of the mirrors M3 is maintained at 30 degrees to reflect the light with the angle spread of 0±1 degree, wherein the angle 0 degree is obtained since the tilting angle θ is maintained at 30 degrees, and the angle spread of the ±1 degree is caused by the angle spread of the ±1 degree of the incident light to the reflecting surface of the mirror M3, as described before.

The tilting angle of the mirrors M4 is shifted to 31 degrees to reflect the light with the angle spread of 2±1 degrees, wherein the angle 2 degrees represents that, due to the shift of the tilting angle θ by +1 degree from the 30 degrees, the light path of the reflected light is shifted by the 2 degrees from the normal line of the top surface of the light guide 22 in the rightward direction in FIG. 4(A), and the angle spread of the ±1 degree is caused by the angle spread of the ±1 degree of the incident right to the reflecting surface of the mirror M4, as described before. Further, the tilting angle of the mirrors M5 is shifted to 29 degrees to reflect the light with the angle spread of 2±1 degrees, wherein the angle 2 degrees represents that, due to the shift of the tilting angle θ by −1 degree from the 30 degrees, the light path of the reflected light is shifted by the 2 degrees from the normal line of the top surface of the light guide 22 in the leftward direction in FIG. 4(A), and the angle spread of the ±1 degree is caused by the angle spread of the ±1 degree of the incident light to the reflecting surface of the mirror M5, as described before.

Figure 3:
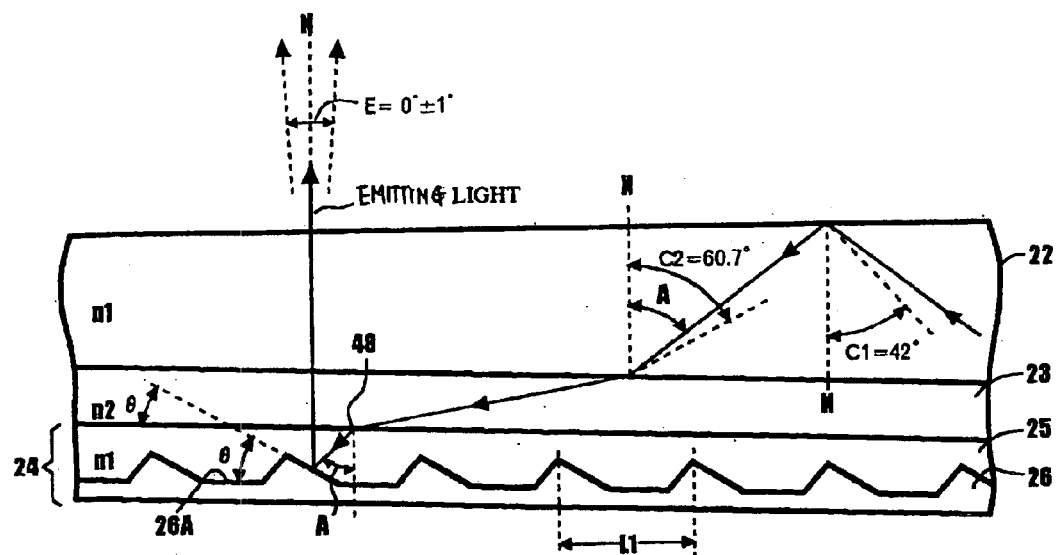
FIGS. 3A and 3B, respectively, show one of the light paths in the backlight apparatus in accordance with the present invention.
Figure 3:
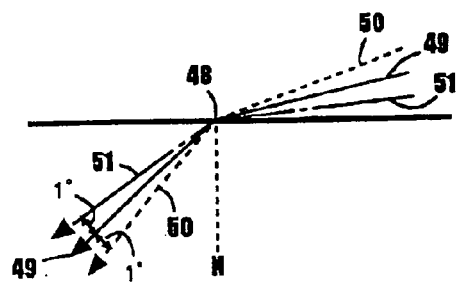
Figure 4:
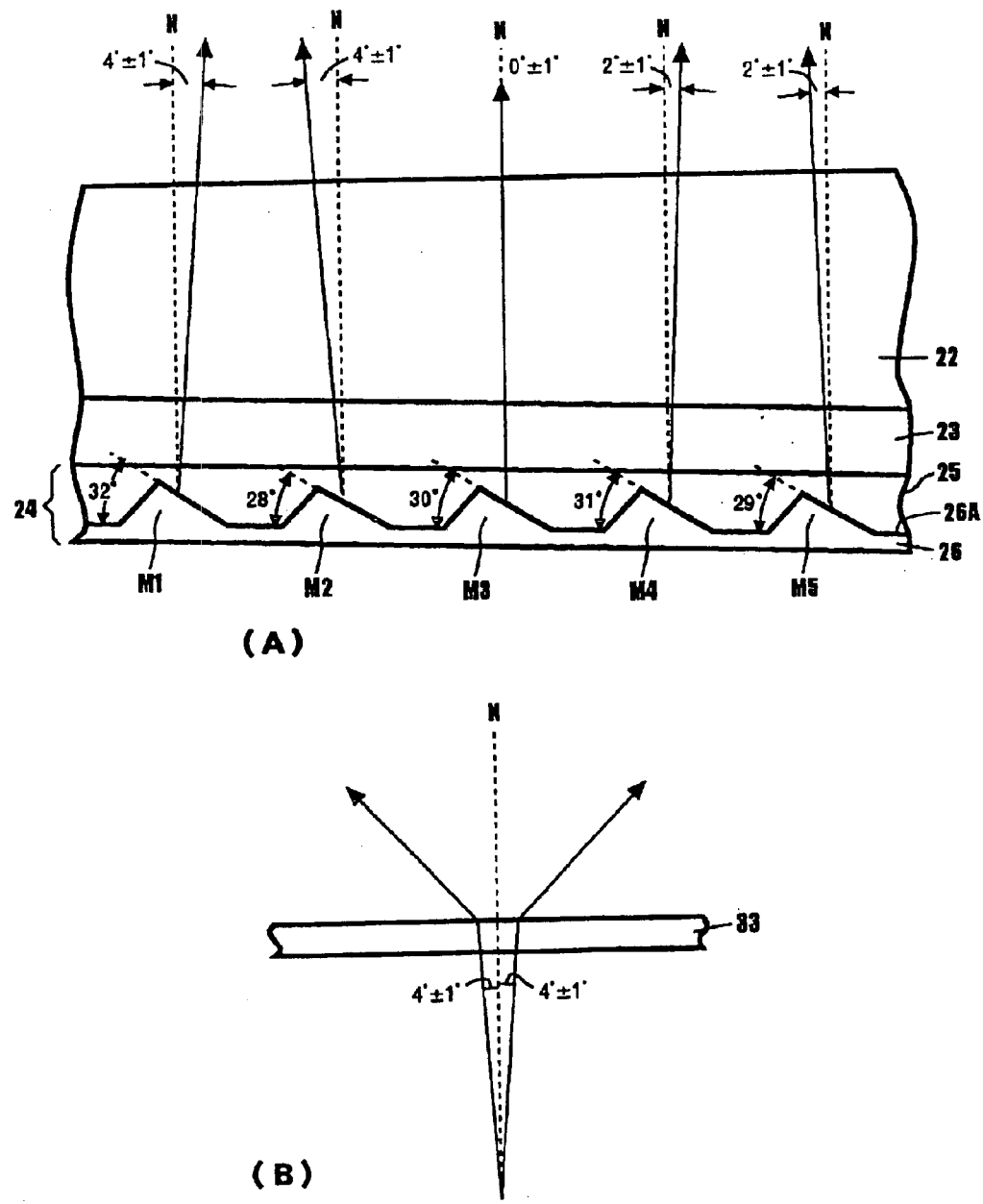
FIGS. 4A and 4B, respectively, show the control of the angle spread of the light emitted from the top surface of a light guide 22.

Although only five mirrors M1 through M5 are shown in FIG. 4, the tilting angle of another mirror(s), not shown, can be shifted to produce the various angle spreads, such as 1±1 degrees, 3±1 degrees, etc., resulting in the intensity of the light within the viewing angle of the 4±1 degrees, as shown in FIG. 4(B), being uniform. The tilting angle θ of the mirrors 26 can be shifted by 30±20 degrees. In other words, the range of the tilting angle θ of the mirrors 26 is 10 degrees through 50 degrees. If the shift of the tilting angle θ exceeds the ±20 degrees, the reflected light from the mirrors 26 is reflected back to the light guide 22 since the incidence angle of the reflected light to the top surface of the light guide 22 becomes larger than the total internal reflection critical angle C1, shown in FIG. 3. The combined light components from the mirrors M1 through M5 and another mirrors are directed to the LCD panel 29, and the light transmitted through the LCD panel 29 is diffused by the light diffusing layer 33 by the predetermined diffusing angle, so that the user can observe the displayed image without decreased contrast ratio over the viewing angle or the diffusing angle (FIG. 4(B)), which is wider than the viewing angle shown in FIG. 2.

Figure 5:
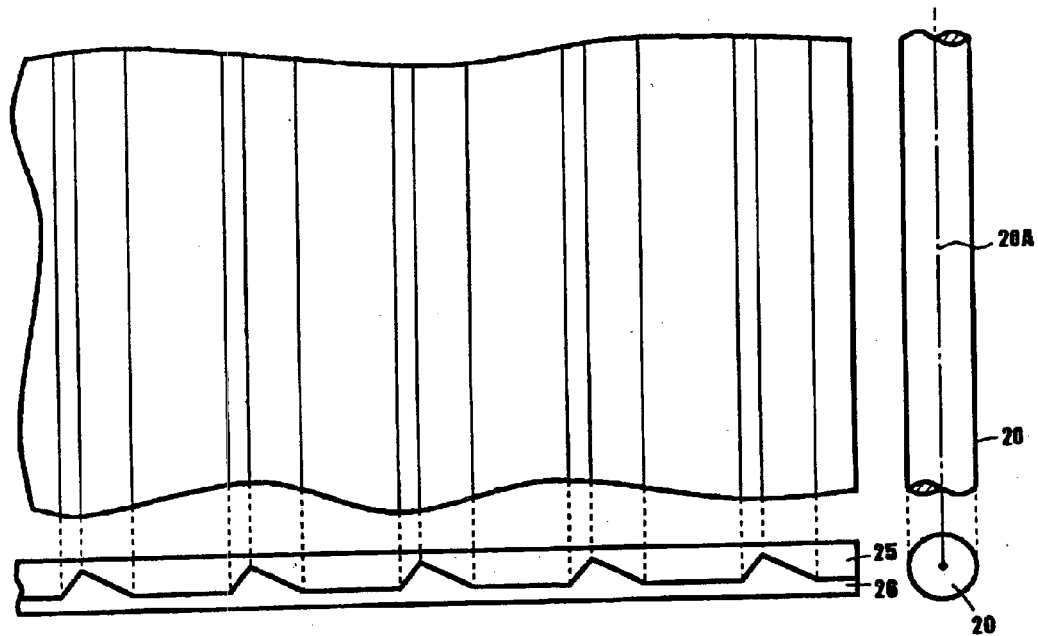
FIG. 5 shows the arrangement of ridges or rising portions forming the mirrors with respect to a fluorescent lamp 20.

FIG. 5 shows the arrangement of ridges or rising portions forming the light reflecting surfaces of the mirrors 26 with respect to the fluorescent lamp 20. The light reflecting surface of each of the mirrors 26 continuously extends in, a direction, which is parallel to a center line 20A of the fluorescent lamp 20.

Figure 6:
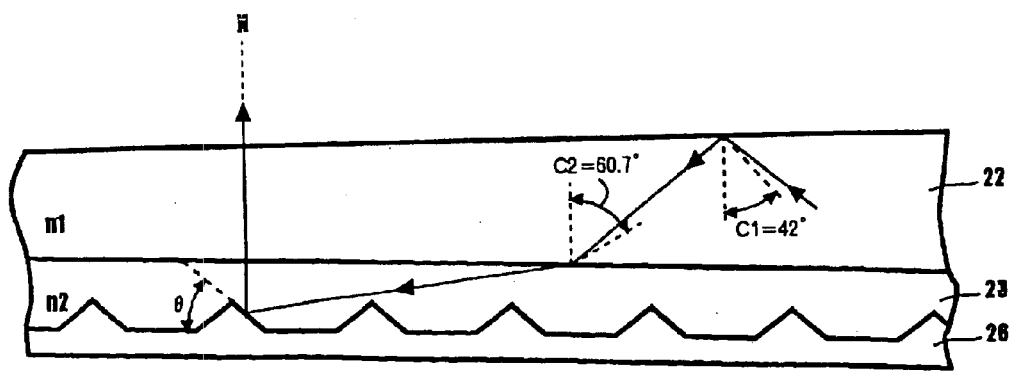
FIG. 6 shows an alternative structure of the backlight apparatus in accordance with the present invention.

FIG. 6 shows an alternative structure of the backlight apparatus in accordance with the present invention. The backlight apparatus shown in FIG. 2 can be replaced by the backlight apparatus shown in FIG. 6. The backlight apparatus shown in FIG. 6 is similar to that shown in FIGS. 2, 3A and 3B, except that the first light transmission layer 23 of a refractive index n2, which is smaller than the refractive index n1 of the wedge-type light guide 22, is integrally formed on the micro mirrors 26. The light source 20, such as the cold cathode fluorescent lamp and the reflecting cover 21 are not shown in FIG. 6. The wedge-type light guide 22 is adjacent to the polarizer 27 and the LCD panel 29, shown in FIG. 2. The light passing into the first light transmission layer 23 is reflected by the mirror 26, and the tilting angle θ of the mirrors is selected to reflect the incidence light to the reflecting surface of the mirror toward the LCD panel 29 (not shown in FIG. 6), in the direction along the normal line on the top surface of the light guide 22. The tilting angle θ of the mirrors 26 can be controlled to control the angle spread of the light from the top surface of the light guide 22, in the manner as described with reference to FIG. 4.

Figure 7:
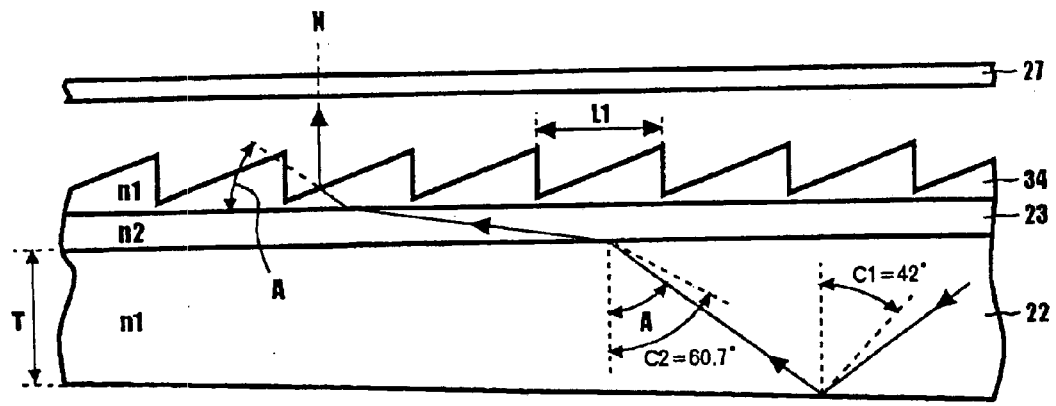
FIG. 7 shows an alternative backlight apparatus in accordance with the present invention.

FIG. 7 shows an alternative backlight apparatus in accordance with the present invention. The backlight apparatus shown in FIG. 2 can be replaced by the backlight apparatus shown in FIG. 7. The backlight apparatus shown in FIG. 7 includes the wedge-type light guide 22, the first light transmission layer 23 and the light deflecting layer 34, such as a prism sheet. It is noted that the wedge-type light guide 22 and the first light transmission layer 23 of the backlight apparatus shown in FIG. 7 are similar to those of the backlight apparatus shown in FIG. 3. The light source 20 and the reflecting cover 21 are arranged to direct the light to the light guide 22, and these are not shown in FIG. 7 for simplifying the drawing. In the backlight apparatus shown in FIG. 7, the bottom surface of the light transmission layer 23 is attached to the top surface of the wedge-type light guide 22, and the prism sheet 34 operating as the light deflecting layer is attached on the top surface of the light transmission layer 23. The surface, from which the light is emitted, of each prism continuously extends in the direction, which is parallel to the center line 20A (FIG. 5) of the fluorescent lamp 20.

In the backlight apparatus shown in FIG. 7, the prism sheet 34 is adjacent to the polarizer 27 and the LCD panel 29, not shown in FIG. 7. FIG. 7 shows the one of the light paths in the alternative backlight apparatus. The light directed into the light guide 22 from the light source 20 is reflected back at both the bottom surface and an interface between the light guide 22 and the light transmission layer 23 as a total internal reflection, if the incidence angle of the light to the bottom surface of the light guide 22 is larger than the total internal reflection critical angle C1 (42 degrees) of the bottom surface, and the incidence angle of the light to the top interface between the light guide 22 and the light transmission layer 23 is larger than the total internal reflection critical angle C2 (60.7 degrees) of the interface. During the total reflection internal reflection, the incidence angle to the bottom surface and the top interface becomes smaller and smaller by the twice of the top angle of the wedge-type light guide 22.

Since the critical angle C1 of the bottom surface of the light guide 22 is still small enough for the light to leak out there, all the light power leaks out through the interface between the light guide 22 having the refractive index n1 and the light transmission layer 23 having the refractive index n2 lower than the n1. The light is transmitted within the light transmission layer 23, and reaches the interface between the layer 23 and the prism sheet 34. The distance L1 of the prism is about 50 μm and is very small in comparison with the size of the sub-pixel of the LCD panel 29. The prism sheet 34 deflects the incidence light toward the polarizer 27 and the LCD panel 29.

By using the material having the refractive index n1 of the value described before, the incidence angle A degrees to the surface of the prism is realized, so that the light is directed to the polarizer 27 with the narrow angle spread as in the case of the backlight apparatus of FIG. 3. In this manner, the light is entered from the light source 20 to the wedge-type light guide 22, then is entered into the light transmission layer 23 after several total internal reflections in the light guide 22, then is entered into the prism sheet 34, then is deflected along the normal direction of the surface of the LCD panel 29, and is finally emitted from the prism sheet 34, in the direction along the normal line of the LCD panel 29, to the polarizer 27 and the LCD panel 29. When the light from the prism sheet 34 passes through the polarizer 27, the LCD panel 29 and the polarizer 28, and passes through the light diffusing layer 33, the light is diffused by the light diffusing layer 33 within a predetermined diffusion angle B, as shown in FIG. 2.

Second Embodiment

Figure 8:
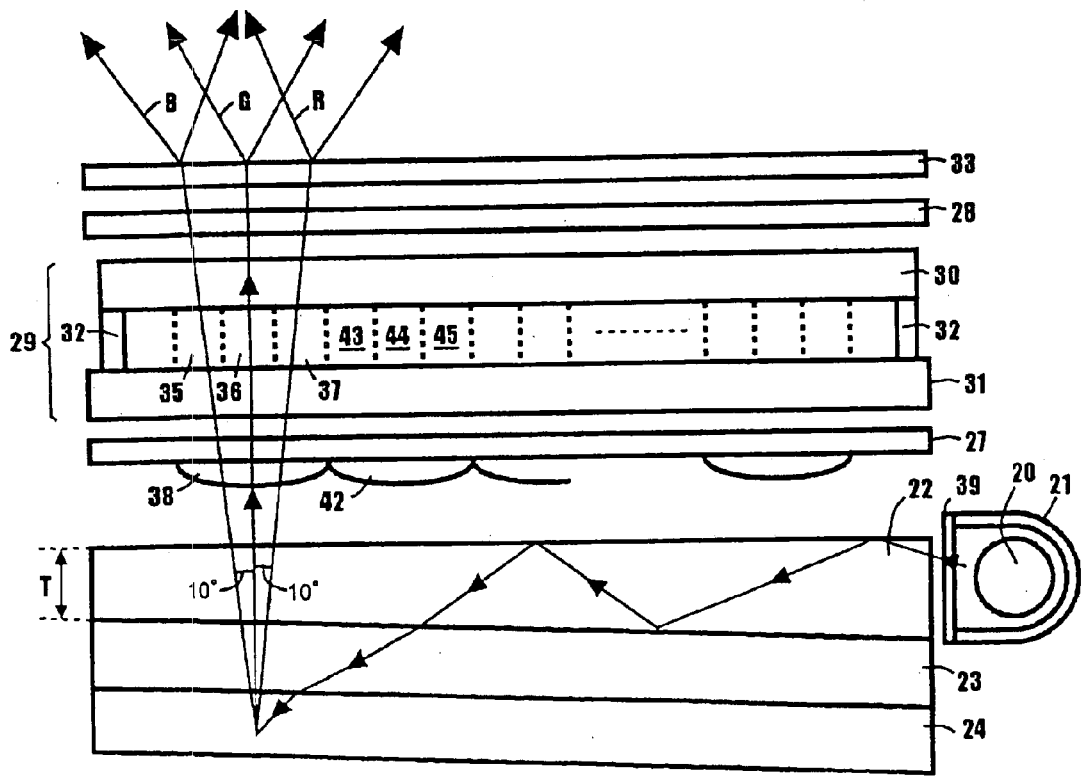
FIG. 8 shows a second embodiment of the color LCD apparatus using the backlight apparatus in accordance with a present invention.

FIG. 8 shows a second embodiment of the color LCD apparatus using the backlight apparatus in accordance with the present invention. The structure and the operation of the LCD apparatus of the second embodiment is similar to the LCD apparatus of the first embodiment shown in FIG. 2 except for the following differences: (1) the light deflecting layer 24 including a reflective diffraction grating 41 (FIG. 9) is used in the second embodiment, (2) the color filter is not formed in the LCD panel 29 in the second embodiment, (3) a cylindrical lens array 38 is provided between the polarizer 27 and the backlight apparatus in the second embodiment, and (4) an optical filter 39 is provided between the light source or the fluorescent lamp 20 and the light guide 22 to filter the light of the particular wavelength.

Figure 9:
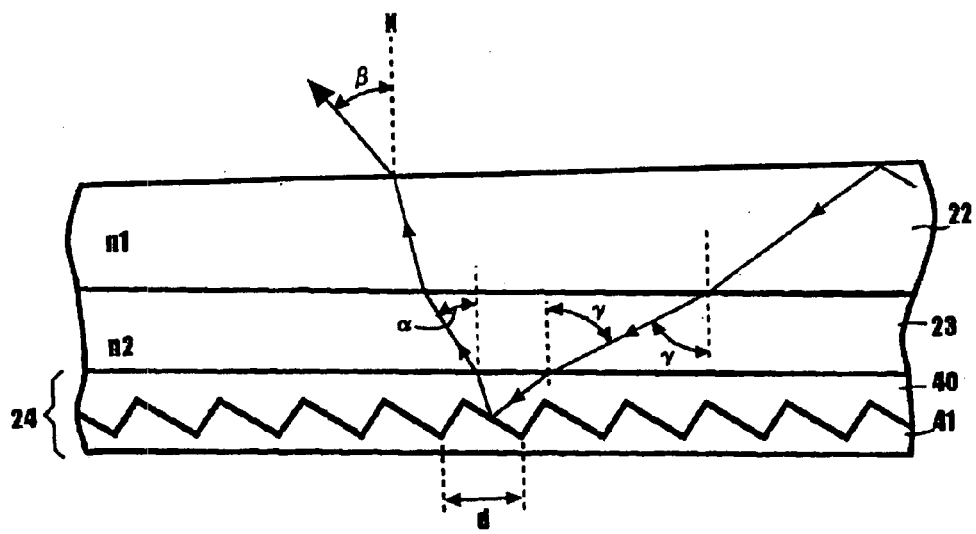
FIG. 9 shows one of the light paths for a color separation by a reflective grating 41 in a light deflecting layer 24.

Regarding the light deflecting layer 24, FIG. 9 shows one of the light paths for a color separation by the reflective diffraction grating 41 in the light deflecting layer 24. The light deflecting layer 24 includes the reflective diffraction grating 41 and a light transmission layer 40. The reflective diffraction grating 41 and the light transmission layer 40 are integrally formed. The refractive index of the light transmission layer 40 is preferably in the range of 1.4 through 2.0, and more preferably is 1.49. The material of the light transmission layer 40 is acrylic resin, glass, polycarbonate, polyethylene or polyester. The material of the reflective diffraction grating 41 is a metal, such as Al, Ni or Ag. The grating pitch (d) has the following relationship with the wavelength ($\lambda$) of the light, the refractive index (n2), the exit angle ($\beta$) of the light from the top surface, the exit angle ($\alpha$) of the light in the light transmission layer 23 having the lower refractive index n2 than the refractive index n1, and the incidence angle $\gamma$ to the interface between the light transmission layer 23 and the light transmission layer 40.

$$n2 \sin \alpha - n2 \sin \gamma = m\lambda/d \text{ and } \sin \beta = n2 \sin \alpha$$

wherein (m) is an integer specifying the order of the diffraction. The angle $\alpha$ usually takes a value in the range of about 70 through 90 degrees. In the case that the green light of $\lambda$=535 nm, m=1, $\alpha$=80 degrees, and n2=1.3, the (d) should be 417.8 nm in order that $\beta$=0. The fact $\beta$=0 indicates that the green light is normal to the top surface of the light guide 22. The blue light ($\lambda$=445 nm) is going through along the light path angled from the green light by −10 degrees, and the red light ($\lambda$=615 nm) is going through along the light path angled from the green light by +10 degrees, as shown in FIG. 8. It is noted that although one light path is shown in FIG. 9 as an example, the above color separation is performed at all the grating points of the diffraction grating 41.

The cylindrical lens 38 of the cylindrical lens array is arranged to direct the blue light from the various grating points to the sub-pixel 35 of the LCD panel 29, to direct the green light from the various grating points to the sub-pixel 36, and to direct the red light from the various grating points to the sub-pixel 37. In this manner, the white light from the fluorescent lamp 20 is separated into the red light, the green light and the blue light by the reflective diffraction grating 41, and each color light is directed to the respective sub-pixel, whereby the color filter used in the first embodiment is not required in the second embodiment. In the same manner, the cylindrical lens 42 is arranged to direct the blue light from the various grating points to the sub-pixel 43, to direct the green light from the various grating points to the sub-pixel 44, and to direct the red light from the various grating points to the sub-pixel 45.

Figure 10:
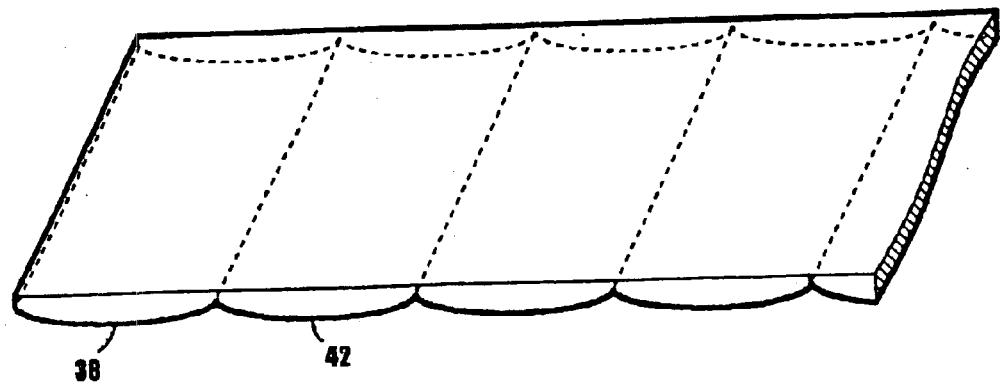
FIG. 10 shows a cylindrical lens array including a plurality of cylindrical lenses, such as lenses 38 and 42.

FIG. 10 shows the cylindrical lens array including a plurality of cylindrical lenses, such as the lenses 38 and 42. The top and the valley of the cylindrical lens array is arranged in parallel to the sub-pixels along the data lines or the gate lines of the LCD panel 29.

Figure 11:
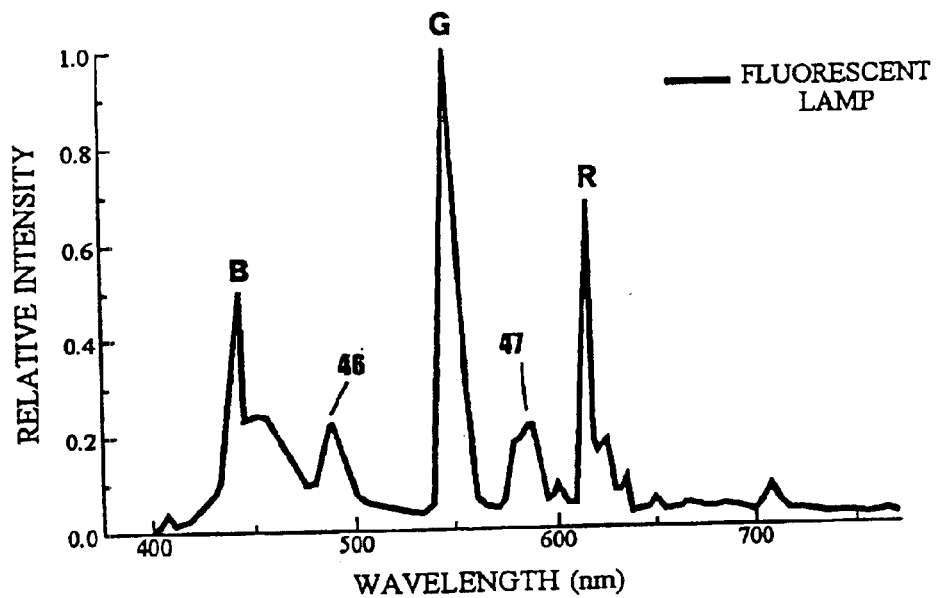
FIG. 11 shows the white light generated by the fluorescent lamp 20.

The operation of the optical filter 39 is described with reference to FIG. 11. FIG. 11 shows the white light generated by the fluorescent lamp 20. The white light includes the various light components, as shown in FIG. 11. The optical filter 39 suppresses the light components 46 and 47.

Figure 12:
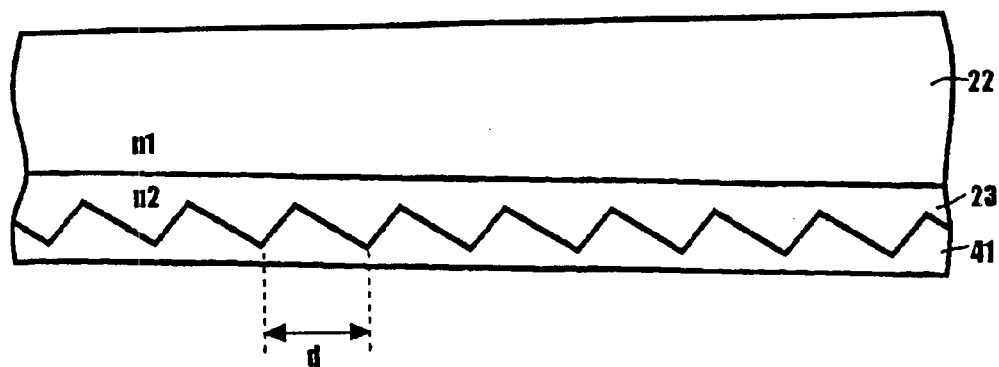
FIG. 12 shows an alternative structure of the backlight apparatus in accordance with the present invention.

FIG. 12 shows an alternative structure of the backlight apparatus in accordance with the present invention. The backlight apparatus shown in FIG. 8 can be replaced by the backlight apparatus shown in FIG. 12. The backlight apparatus shown in FIG. 12 is similar to that shown in FIGS. 8 and 9, except that the light transmission layer 23 of a refractive index n2, which is smaller than the refractive index n1 of the wedge-type light guide 22, is integrally formed on the reflective diffraction grating 41. The light source 20, such as the cold cathode fluorescent lamp 20 and the reflecting cover 21 are not shown in FIG. 12. The wedge-type light guide 22 is adjacent to the polarizer 27 and the LCD panel 29, shown in FIG. 2. The color separation is performed in the manner as described with reference to FIG. 9.

Although the TN liquid crystal material is used in the embodiments described above, any liquid crystal materials, such as ferroelectric liquid crystal material, and antiferroelectric liquid crystal material, which are capable of electrically controlling the polarized light, can be used in the invention.

With the unique and unobvious feature of the present invention, a light guide apparatus and the backlight apparatus can be produced which can generate light with an angle spread or an angle less than 10 degrees FWHM, which can reduce the fabrication cost, and which can improve the efficiency of usage of the light from the light source, and can produce an LCD apparatus using the light guide apparatus and the backlight apparatus.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A backlight apparatus comprising:
   a wedge-type light guide comprising a refractive index n1, and comprising a top surface, a bottom surface and a side surface;
   a light source for directing light to said side surface of said wedge-type light guide;
   a light transmission layer comprising a refractive index n2, which is smaller than said refractive index n1, and comprising a top surface and a bottom surface, wherein said bottom surface of said light transmission layer is attached to said top surface of said wedge-type light guide; and
   a plurality of prisms attached on said top surface of said light transmission layer for directing the incident light from said light transmission layer toward a light path along a direction of a normal line of said top surface of said light transmission layer and for controlling an angle spread of said incident light from the top said light-transmission layer.

2. The backlight apparatus according to claim 1, wherein the range of said refractive index n1 of said wedge-type light guide is substantially 1.4 through substantially 2.0, and the range of said refractive index n2 of said light transmission layer is substantially 1.2 through substantially 1.4.

3. The backlight apparatus according to claim 2, wherein said refractive index n1 of said wedge-type light guide is substantially 1.49, and said refractive index n2 of said light transmission layer is substantially 1.3.

4. A liquid crystal display (LCD) apparatus comprising:
an LCD panel including an upper transparent substrate, a lower transparent substrate, and a liquid crystal material filled between said upper transparent substrate and said lower transparent substrate;
a light diffusing layer adjacent to said upper transparent substrate; and
a backlight apparatus adjacent to said lower transparent substrate, wherein said backlight apparatus comprises:
a wedge-type light guide comprising a refractive index n1, and comprising a top surface, a bottom surface and a side surface;
a light source for directing light to said side surface of said wedge-type light guide;
a light transmission layer comprising a refractive index n2, which is smaller than said refractive index n1, and comprising a top surface and a bottom surface, wherein said bottom surface of said light transmission layer is attached to said top surface of said wedge-type light guide; and
a plurality of prisms attached on said top surface of said light transmission layer for directing the incident light from said light transmission layer toward a light path along a direction of a normal line of said top surface of said light transmission layer and for controlling an angle spread of said incident light from the top surface of said light-transmission layer.

5. The LCD apparatus according to claim 4, wherein the range of said refractive index n1 of said wedge-type light guide is substantially 1.4 through substantially 2.0, and the range of said refractive index n2 of said light transmission layer is substantially 1.2 through substantially 1.4.

6. The LCD apparatus according to claim 4, wherein said refractive index n1 of said wedge-type light guide is substantially 1.49, and said refractive index n2 of said light transmission layer is substantially 1.3.

7. A light guide apparatus comprising:
a wedge-type light guide comprising a refractive index n1, and comprising a top surface, a bottom surface and a side surface;
a light transmission layer comprising a refractive index n2, which is smaller than said refractive index n1, and comprising a top surface and a bottom surface, wherein said bottom surface of said light transmission layer is attached to said top surface of said wedge-type light guide; and
a plurality of prisms attached on said top surface of said light transmission layer for directing the incident light from said light transmission layer toward a light path along a direction of a normal line of said top surface of said light transmission layer and for controlling an angle spread of said incident light from the top surface of said light-transmission layer.

8. The backlight apparatus according to claim 1, wherein said plurality of prisms for controlling said angle spread of said incident light from the top surface of said light-transmission layer narrow said angle spread of said incident light from the top surface of said light-transmission layer.

9. The liquid crystal display (LCD) apparatus according to claim 4, wherein said plurality of prisms for controlling said angle spread of said incident light from the top surface of said light-transmission layer narrow said angle spread of said incident light from the top surface of said light-transmission layer.

10. The light guide apparatus according to claim 7, wherein said plurality of prisms for controlling said angle spread of said incident light from the top surface of said light-transmission layer narrow said angle spread of said incident light from the top surface of said light-transmission layer.

11. The backlight apparatus according to claim 1, further comprising a polarizer adjacent to said plurality of prisms,
wherein said incident light is emitted from said plurality of prisms in said direction of said normal line of said top surface of said light transmission layer to said polanzer.

12. The liquid crystal display (LCD) apparatus according to claim 4, further comprising a polarizer adjacent to said plurality of prisms,
wherein said incident light is emitted from said plurality of prisms in said direction of said normal line of said top surface of said light transmission layer to said polarizer.

13. The light guide apparatus according to claim 7, further comprising a polarizer adjacent to said plurality of prisms,
wherein said incident light is emitted from said plurality of prisms in said direction of said normal line of said top surface of said light transmission layer to said polarizer.

14. A backlight apparatus comprising:
a wedge-shaped light guide comprising a refractive index n1,
wherein said wedge-shaped light guide includes a top surface and a side surface, said side surface receiving light from a light source;
a light transmission layer comprising a refractive index n2 and includes a top surface and a bottom surface, said bottom surface being disposed directly on said top surface of said wedge-shaped light guide, and
wherein said refractive index n2 is less than said refractive index n1; and means for directing the incident light from said light transmission layer toward a light path along a direction of a normal line of said top surface of said light transmission layer and for controlling an angle spread of said incident light from the top surface of said light-transmission layer,
wherein said means for directing and controlling is disposed directly on said top surface of said light transmission layer.

* * * * *